(12) United States Patent
Morrow et al.

(10) Patent No.: US 7,619,182 B2
(45) Date of Patent: *Nov. 17, 2009

(54) WARMING DRAWER

(75) Inventors: Richard K. Morrow, St. Joseph, MI (US); Frederick R. Stave, Patriot, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/379,678

(22) Filed: Apr. 21, 2006

(65) Prior Publication Data

US 2007/0158327 A1    Jul. 12, 2007

Related U.S. Application Data

(60) Provisional application No. 60/743,104, filed on Jan. 8, 2006, provisional application No. 60/743,105, filed on Jan. 8, 2006.

(51) Int. Cl.
*F24C 15/34* (2006.01)
*A47J 39/02* (2006.01)
*A47B 77/08* (2006.01)
*A47B 77/16* (2006.01)
*A21B 1/40* (2006.01)

(52) U.S. Cl. .................. 219/391; 219/409; 219/411; 219/413; 126/273 R

(58) Field of Classification Search ......... 219/395–411, 219/490, 494, 385; 99/774, 779, 480, 482
See application file for complete search history.

(56) References Cited

U.S. PATENT DOCUMENTS

| | | | |
|---|---|---|---|
| 2,485,359 A | 10/1949 | Cook et al. | |
| 2,507,920 A | 5/1950 | McCormick | |
| 2,566,353 A | 9/1951 | Mills | |
| 2,807,841 A * | 10/1957 | Janos | 49/478.1 |
| 2,883,978 A * | 4/1959 | Nelson et al. | 126/39 C |
| 3,176,118 A * | 3/1965 | Scott | 219/394 |
| 3,297,386 A | 1/1967 | Stanek et al. | |
| 3,331,942 A * | 7/1967 | Scott | 219/391 |
| 3,490,823 A | 1/1970 | Neu et al. | |
| 4,116,512 A * | 9/1978 | Wiser | 312/330.1 |
| 4,149,518 A | 4/1979 | Schmidt et al. | |
| 4,317,025 A | 2/1982 | Starnes | |
| 4,317,607 A | 3/1982 | Gomolka | |
| 4,605,840 A | 8/1986 | Koopman | |

(Continued)

OTHER PUBLICATIONS

The documents listed hereinabove were cited in the European Search Report EP 06255772.3 dated May 7, 2007 received in connection with a European Application corresponding to the above-referenced U.S. application.

*Primary Examiner*—Joseph M Pelham
(74) *Attorney, Agent, or Firm*—John W. Morrison; McGarry Bair P.C.

(57) ABSTRACT

A warming drawer for mounting within a cabinet capable of maintaining the temperature in the warming drawer at one of a proofing temperature, a warming temperature, and a slow cooking temperature. The warming drawer can also include a housing having opposing side walls and at least one spacer extending from each of the side walls to space the side walls from the cabinet when the warming drawer is mounted within the cabinet to form dead air spaces between the side walls and the cabinet.

34 Claims, 8 Drawing Sheets

U.S. PATENT DOCUMENTS

| | | | | |
|---|---|---|---|---|
| 4,641,015 A * | 2/1987 | Mayeur | ............... | 219/386 |
| 4,912,727 A * | 3/1990 | Schubert | ............... | 312/334.8 |
| 6,124,572 A | 9/2000 | Spilger et al. | | |
| 6,166,353 A | 12/2000 | Senneville et al. | | |
| 6,191,391 B1 | 2/2001 | Deo et al. | | |
| 6,370,882 B1 | 4/2002 | Adamski et al. | | |
| 6,437,293 B2 * | 8/2002 | Wurm et al. | ............... | 219/413 |
| 6,849,835 B2 | 2/2005 | Bollmers et al. | | |
| 6,917,016 B2 | 7/2005 | Backer et al. | | |
| 2001/0020612 A1 * | 9/2001 | Wurm et al. | ............... | 219/413 |
| 2002/0121095 A1 * | 9/2002 | Adamski et al. | ............... | 62/3.6 |
| 2003/0196940 A1 * | 10/2003 | Mullaney, Jr. | ............... | 210/167 |
| 2004/0027001 A1 | 2/2004 | Reed, III | | |
| 2004/0089648 A1 * | 5/2004 | Griffey et al. | ............... | 219/400 |
| 2004/0169035 A1 | 9/2004 | Bollmers et al. | | |
| 2005/0211696 A1 | 9/2005 | Adamski | | |
| 2005/0274712 A1 | 12/2005 | Gagas et al. | | |
| 2006/0043087 A1 * | 3/2006 | Gagas et al. | ............... | 219/391 |
| 2006/0163239 A1 * | 7/2006 | Yoshidome et al. | ............... | 219/392 |

* cited by examiner

WARMING DRAWER

CROSS-REFERENCE TO RELATED APPLICATION

This application claims the benefit of U.S. Provisional Application Ser. Nos. 60/743,104 and 60/743,105, filed Jan. 8, 2006, which are incorporated herein in their entirety.

BACKGROUND OF THE INVENTION 1. field of the invention

The invention relates to a temperature-controlled drawer apparatus that can be mounted in cabinetry and can be maintained at a preselected temperature for warming and cooking food items.

2. description of the related art

Many residential kitchens are provided with a warming drawer that is heated, typically by electrical or gas heating elements, to a desired temperature for various purposes, such as warming plates to receive cooked food, or warming or maintaining previously cooked foods at a desired temperature without further cooking. Such warming drawers serve many of the purposes of a cooking oven, but are of a simpler design, less expensive, smaller, and operate at a lower temperature, thereby enabling the principal kitchen oven to be used for cooking other foods while selected food items are warmed or maintained in a warmed condition.

Warming drawers are frequently mounted in wooden cabinetry. Current safety standards limit the temperature of the cabinet as heated by the warming drawer. Consequently, the warming drawer must typically be enclosed within a larger, insulated cavity. This impacts the overall and working dimensions of the drawer, and increases the cost of the warming drawer. The safety standards can also limit the temperature to which the warming drawer can be heated, thereby limiting its utility.

SUMMARY OF THE INVENTION

A warming drawer for mounting within a cabinet having a recess in which the warming drawer is received. In one embodiment, the warming drawer comprises a housing defining a chamber with an open face and having opposing side walls that define at least a portion of the chamber, a drawer moveably mounted to the housing for movement into and out of the chamber through the open face, and at least one spacer extending from each of the side walls to space the side walls from the cabinet when the warming drawer is mounted within the recess of the cabinet to form dead air spaces between the side walls and the cabinet.

In another embodiment, the warming drawer is moveably mounted to the housing for movement into and out of the chamber through the open face between a closed position and an opened position. A seal is provided on one of the housing and the drawer, and forms a seal between the housing and drawer when the drawer is in the closed position. An active closer urges the drawer into the closed position.

In yet another embodiment, the warming drawer comprises a bottom wall and a peripheral wall extending upwardly from the bottom wall. A heating element is located in the housing such that the heating element is beneath the drawer when the drawer is in the closed position, and the heating element is configured such that a portion of the heating element is nominally located beneath the peripheral wall.

DESCRIPTION OF AN EMBODIMENT OF THE INVENTION

Prior to describing an embodiment of the invention, a brief overview of the benefits of the invention should prove useful to a full understanding of the invention. The invention advantageously combines the slow cooking functionality of a traditional slow cooker, a/k/a crock pot, with a warming drawer. Traditional slow cookers are operated at a temperature range of 220 to 250° F., which is higher than the temperatures achievable with a traditional warming drawer (about 210° F.). Warming drawers typically cannot be operated at the slow cooking temperatures and still meet current safety standards, such as those promoted by Underwrites Laboratory. These safety standards require that the temperature of the cabinet surrounding the warming drawer not exceed a predetermined threshold temperature. Slow cookers do not have this concern as they are not mounted in a cabinet and their heat can be dissipated into the air, whereas, for a warming drawer, the heat is transferred to the surrounding cabinet structure. The invention results in a warming drawer structure that permits the warming drawer to be operated at slow cooking temperatures and times while cost effectively meeting the relevant safety standards for a warming drawer. As such, the warming drawer described herein can provide both warming drawer functionality and slow cooking functionality. The addition of the slow cooking functionality is expanded on by the warming drawer in that the warmer drawer can accommodate larger size containers than a slow cooker and can accommodate irregularly shaped containers, unlike the traditional slow cooker that is limited to a specifically designed container.

The warming drawer according to the invention also has the ability to accurately maintain relatively low temperatures (around 100° F.), which is suitable for bread proofing. Not all warming drawers can accurately maintain a low enough proofing temperature over the desired time. If the temperature is too high, the bread begins to bake instead of rise. Thus, the warming drawer of the invention is able to operate at temperatures suitable for proofing, warming, and slow cooking.

Prior art warming drawers are not capable of providing such a temperature range because of an inability to meet the requisite safety standards and/or an inability to accurately maintain the lower temperatures.

Figure 1:
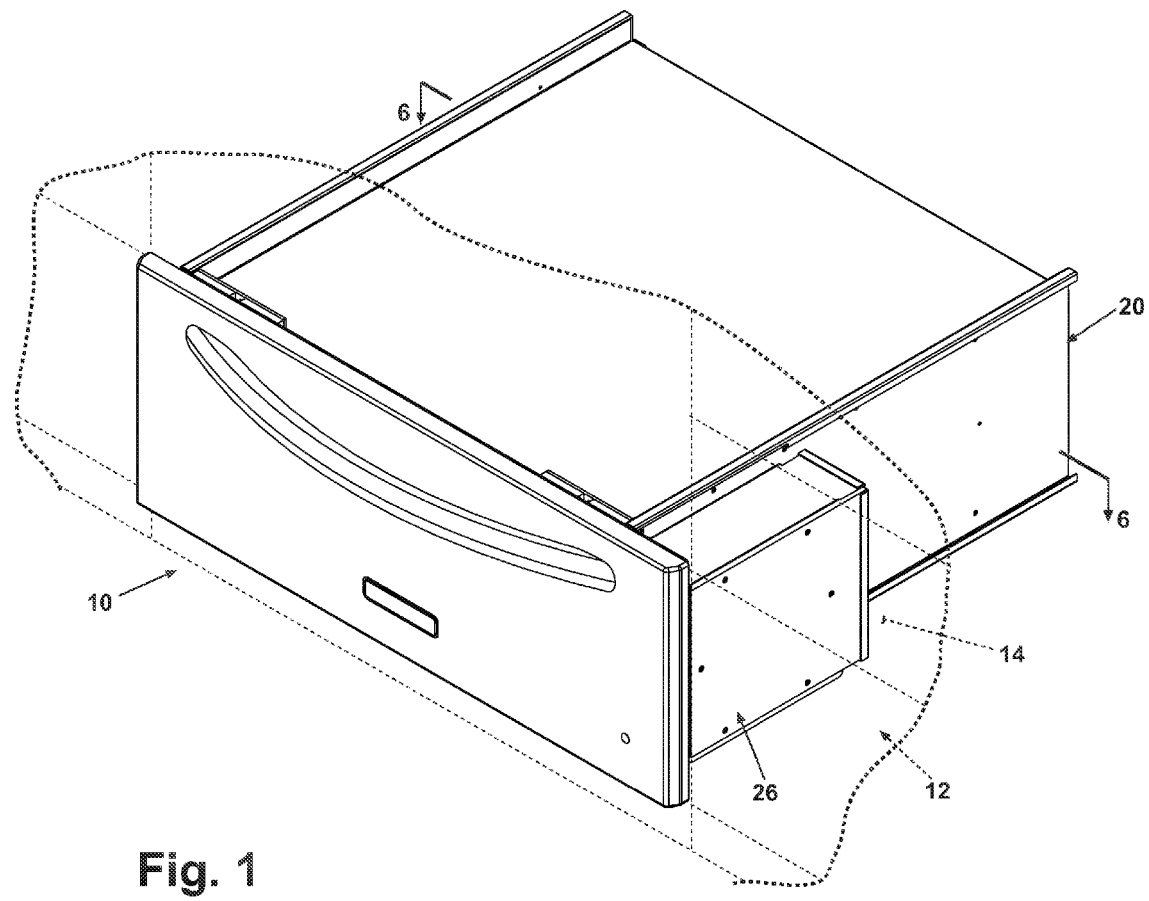
FIG. 1 is a perspective view of an embodiment of the invention comprising a warming drawer installed in a cabinet, with the cabinet illustrated in phantom for clarity and the warming drawer in a closed position.
Figure 2:
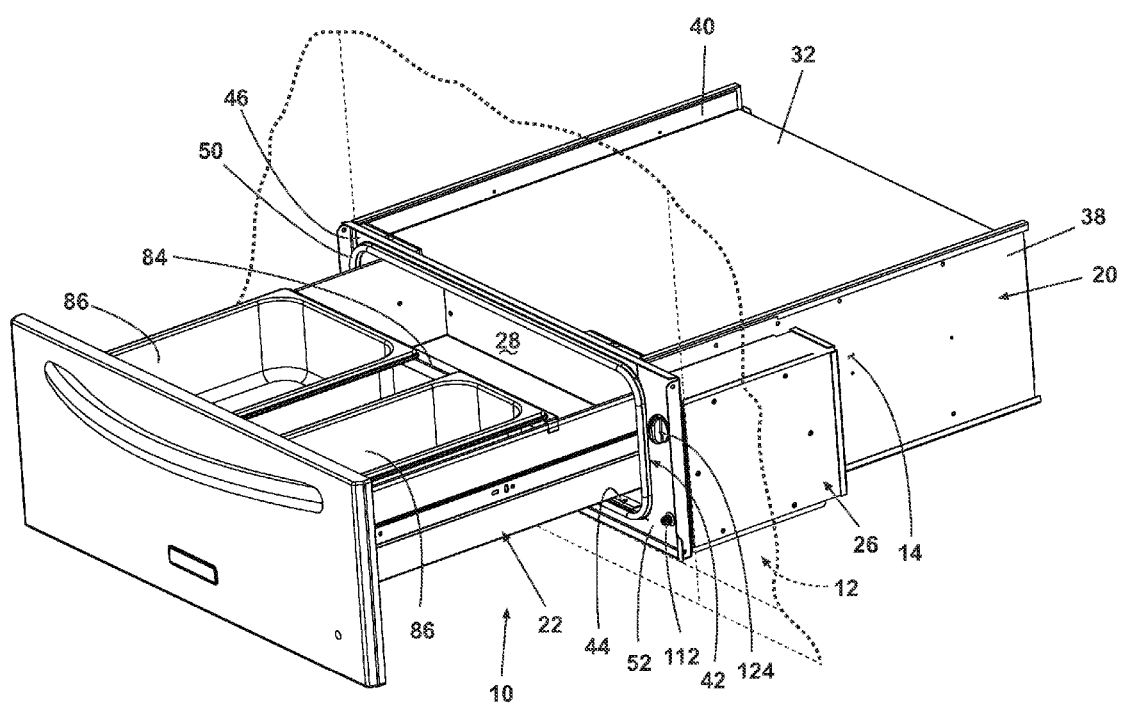
FIG. 2 is a perspective view of the warming drawer and cabinet illustrated in FIG. 1 with the warming drawer in an open position.

Referring now to the Figures, and in particular to FIGS. 1 and 2, an embodiment of the invention comprising a warming drawer 10 is illustrated mounted in a cabinet 12, such as conventional kitchen cabinetry, in a recess 14 configured to receive the warming drawer 10 therein. FIG. 1 illustrates the drawer 22 in a closed position relative to the housing 20 and FIG. 2 illustrates the drawer 22 in an open position. It is contemplated that the warming drawer 10 can be mounted in cabinet structures other than kitchen cabinets. For example, cabinet 12 can be a masonry cabinet formed in an outside barbeque area. The invention is not limited to the cabinet structure.

Figure 3:
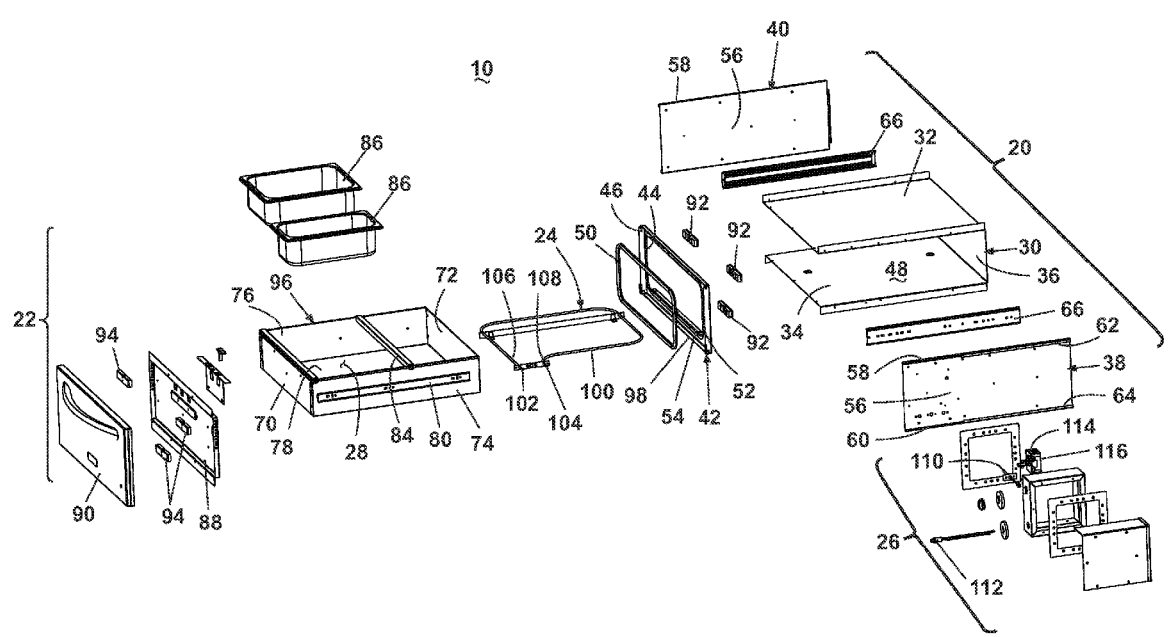
FIG. 3 is an exploded view of the warming drawer illustrated in FIG. 1.

As illustrated in FIGS. 2 and 3, the warming drawer 10 comprises a housing 20 enclosing a drawer 22 and a heating element 24, with the heating element 24 being controlled by a control module 26. The housing 20 comprises a housing shell 30 having a planar top wall 32 and a planar bottom wall 34 in parallel opposed disposition, interconnected along parallel edges by a back wall 36 extending orthogonally thereto. A pair of parallel opposed planar side walls 38, 40 extend between the top wall 32, the bottom wall 34, and the back wall 36. A front wall 42 extends in parallel opposed disposition to the back wall 36 between the top wall 32, the bottom wall 34, and the side walls 38, 40. The front wall 42 has an opening 44 therethrough to define an open face 46. The walls 32-42 define a drawer chamber 48, access to which is provided by the opening 44. A peripheral lip 54 extends around the periphery of the opening 44 for attachment of a resilient, heat-resistant seal 50 thereto. The open face 46 adjacent the peripheral lip 54 defines a peripheral flange 98, which transitions laterally away from a side edge of the opening 44 to define a control module flange 52 associated with the control module 26.

Figure 4:
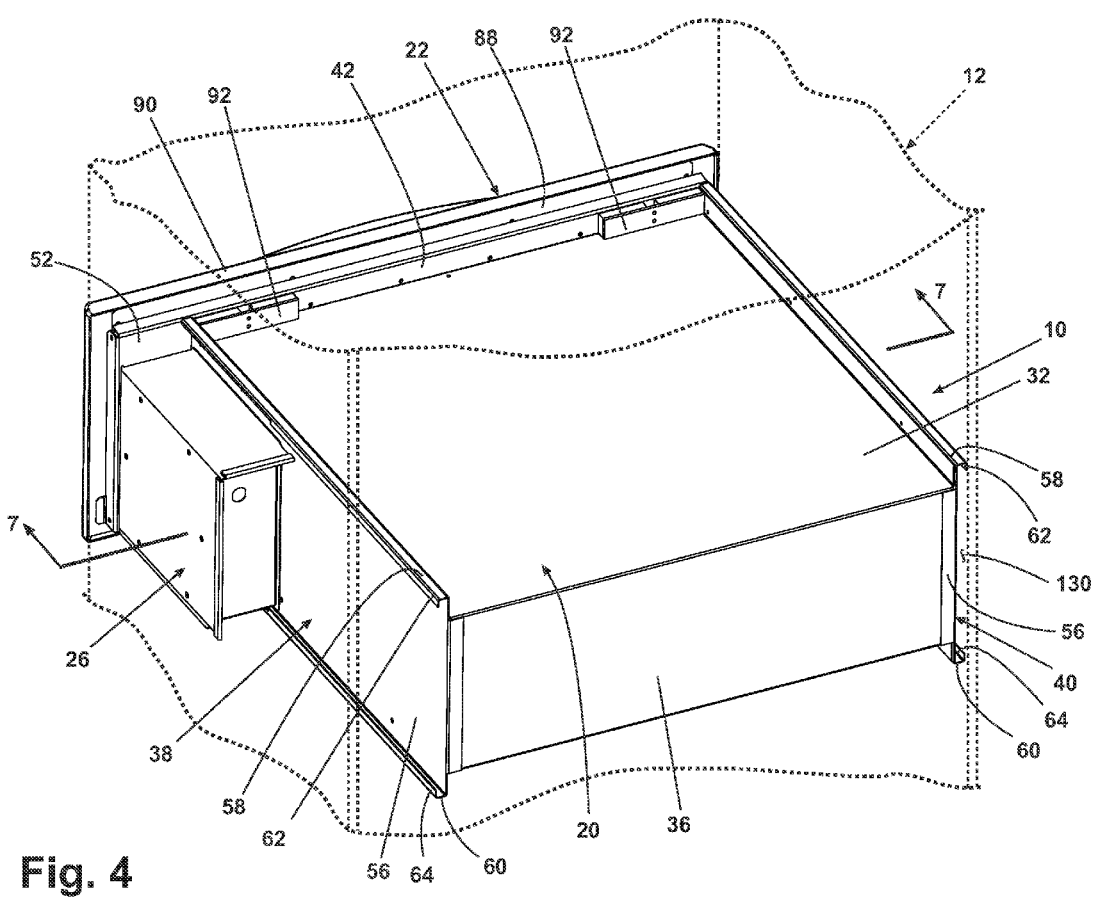
FIG. 4 is a rear perspective view of the warming drawer and cabinet illustrated in FIG. 1 showing a pair of spacers for spacing the warming drawer from the cabinet.

Referring to FIGS. 3 and 4 the side walls 38, 40 each comprise a planar side panel 56 having a spacer strip 58 extending longitudinally along an upper edge thereof in parallel opposed disposition to a spacer strip 60 extending longitudinally along a lower edge thereof. The spacer strips 58, 60 extend orthogonally away from the side panel 56 to terminate in contact flanges 62, 64, respectively, extending orthogonally toward each other to define a somewhat C-shaped cross-section. Alternatively, separate spacers not integrated into the side panel 56 can be used between the side panel 56 and the cabinetry. Such spacers must be mounted between the side walls 38, 40 or side panels 56 and the cabinetry when the warming drawer 10 is installed, and may be supplied in different sizes corresponding the required spacing between the side walls 38, 40 and the cabinetry. However, the spacer strips 58, 60 integrated with the panel 56 are preferable as they eliminate the potential for using an incorrect spacer, and ensure the proper spacing to meet the applicable safety standards.

The spacers form an air gap 130 that spaces the side walls 38, 40 from the surrounding cabinet structure. The spacers are the only contact points between the side walls 38, 40, which minimizes the conduction of heat directly from the side walls 38, 40 to the cabinet 12 because the side walls 38, 40 do not contact the cabinet 12. With the side walls 38, 40 spaced from the cabinet 12, convection is the primary mode of heat transfer from the housing 20 to the cabinet 12, which is less efficient at transferring heat than conduction. The cabinet 12 also has more time to dissipate heat into the surrounding environment, which keeps the cabinet temperature within applicable safety limits. The spacers 58, 60 are selected such that the air 130 is sized to permit the warming drawer to meet the current safety standards, without the need to wrap the housing in insulation, even when the drawer is operated at the higher slow cooking temperatures of around 250° F.

A pair of drawer guides 66, 68 is attached to the side walls 38, 40, respectively, opposite the spacer strips 58, 60.

Referring again to FIG. 3, the drawer 22 comprises a generally well known box-like structure having a front wall 70, a back wall 72, a pair of sidewalls 74, 76, and a bottom wall 78 forming a generally rectilinear configuration. The walls 70-76 define a peripheral wall 96. A pair of drawer slides 80, 82 is attached to the side walls 74, 76, respectively, for cooperative registry with the drawer guides 60, 68 to enable the drawer 22 to be readily moved between an open position and a closed position within the housing 20. The drawer 22 defines a heating chamber 28 in which cooking dishes and the like can be received for heating.

One or more support members 84 can be movably supported between the side walls 74, 76 for supporting a container 86 having dimensions smaller than the dimensions of the heating chamber 28.

Figure 5:
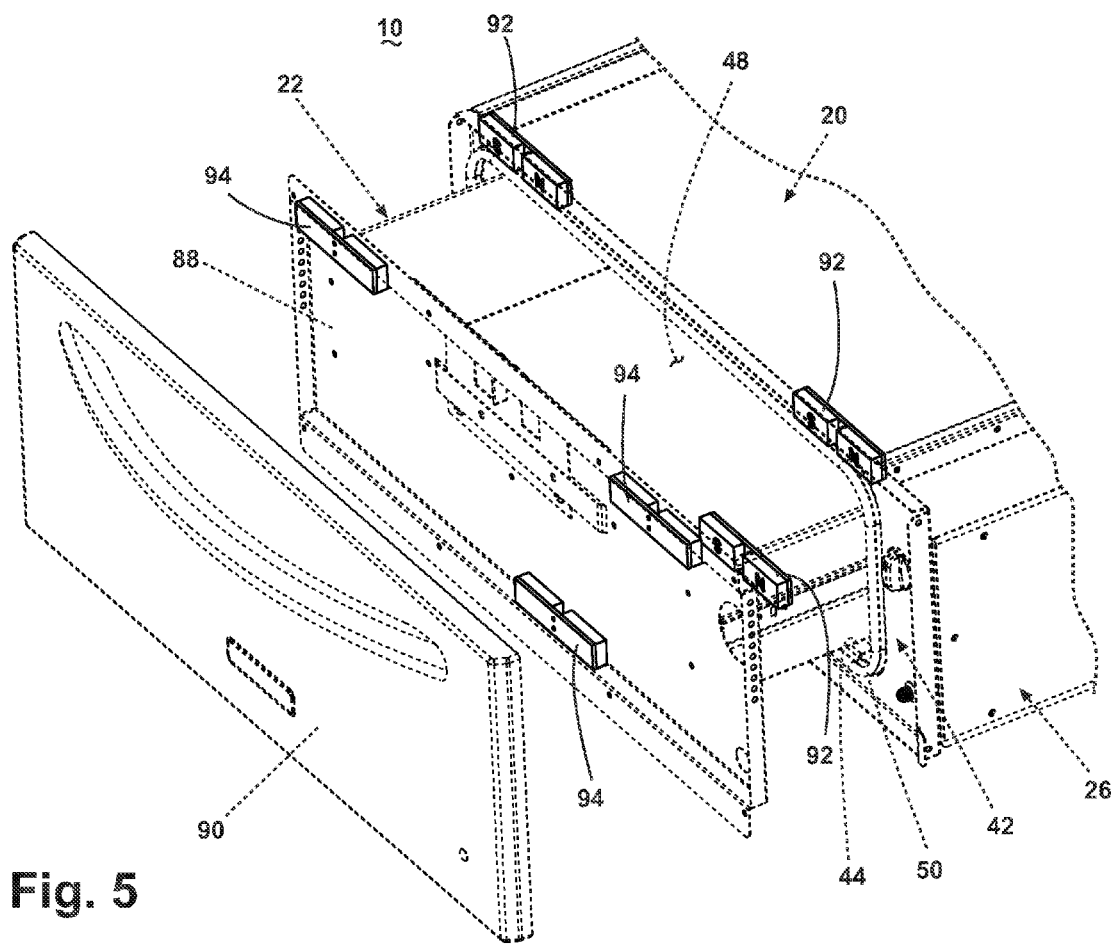
FIG. 5 is a perspective view of the warming drawer illustrated in FIG. 1 with selected elements shown in phantom and showing an active closer for urging the warming drawer into a closed position

Referring also to FIG. 5, the drawer 22 is finished along the front wall 70 by an inner face panel 88 joined to an outer face panel 90. The inner face panel 88 is a generally planar member having a peripheral flange adapted for contact with the seal 50 around the opening 44. The outer face panel 90 can be provided with a handle to facilitate the opening and closing of the drawer 22. Incorporated into and between the inner face panel 88 and the outer face panel 90 is an active closer assembly illustrated in the form of a plurality of closer magnets 94. A pair of closer magnets 94 is attached to the inner face panel 88 along an upper edge thereof, and a single closer magnet 94 is attached to the inner face panel 88 along a central portion of a lower edge thereof. The closer magnets 94 are configured for magnetic engagement with a plurality of closer magnets 92 incorporated into the housing 20. A pair of closer magnets 92 is attached to the interior of the front wall 42 along an upper edge thereof in opposed disposition with the pair of upper closer magnets 94, and a single closer magnet 92 is attached to the interior of the front wall 42 along a central portion of a lower edge thereof in opposed disposition with the single closer magnet 94. The closer magnets 92, 94 will be in magnetic registry when the drawer 22 is fully received in the drawer chamber 48. A greater or lesser number of magnets, or a different configuration of magnets, can be employed based upon such factors as the closure force desired.

The closer magnets 92, 94 can be configured to deliver approximately 5 to 10 pounds of closing force to the drawer 22, sufficient to maintain the drawer 22 tightly closed against the open face 46 of the front wall 42. The tight closure of the drawer 22 causes a complete contact of the seal between the drawer 22 and the housing 20, which results in an improved retention of heat in the drawer, and further contributes to the control of temperatures in the drawer. That is, with a complete seal, there is minimal or no heated air escaping from the heating chamber and being replaced by ambient or cooler air. Thus, the control system need not activate the heating element 24 as often to maintain the temperature at the set temperature. The force is great enough that the drawer will self-close when it gets within a few inches of the housing. The force is also sufficient to compress the seal between the drawer and the housing along the entire periphery of the seal, which enhances the sealing between the drawer and the housing. The force is small enough that it does not hinder a user from opening and closing the drawer.

Figure 6:
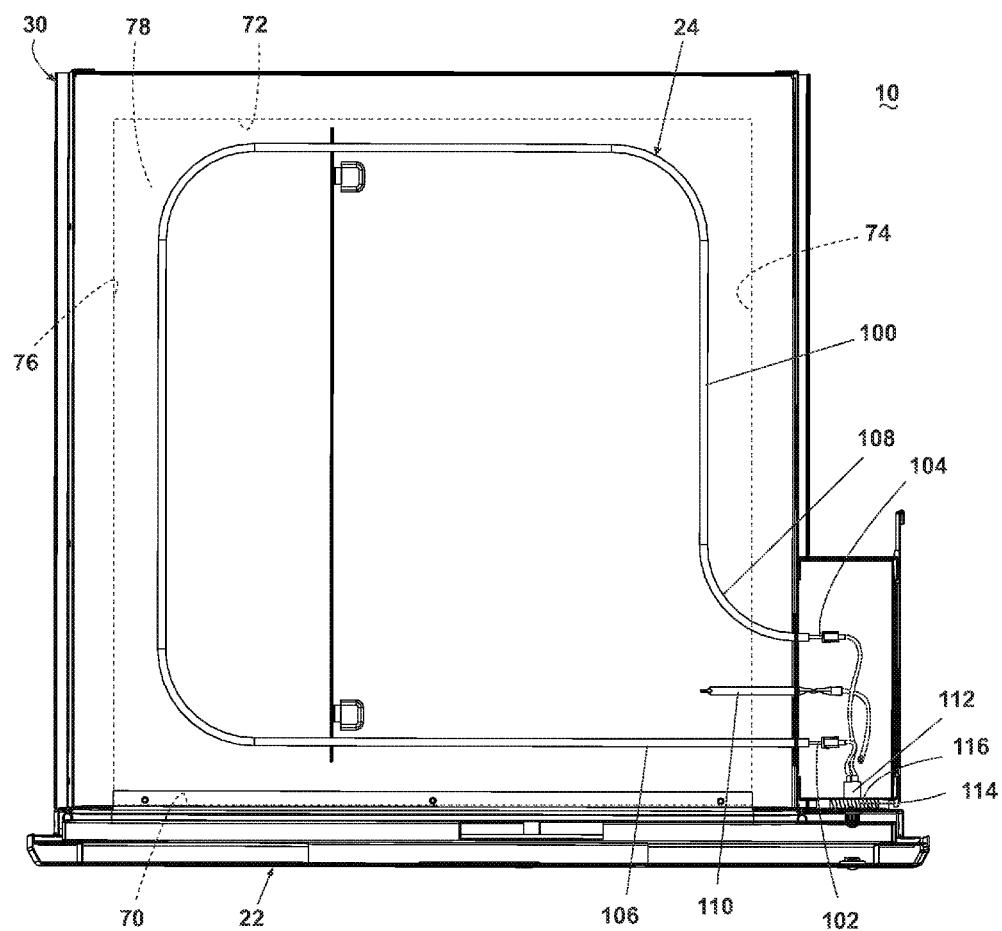
FIG. 6 is a sectional view taken along view line 6-6 of FIG. 1 with elements shown in phantom and illustrating the relative positions of a heating element and warming drawer walls.

Referring now to FIG. 6, the heating element 24 is made from a well known resistance heating element material, such as a Calrod element. The heating element is formed into a planar heater loop 100, and positioned along a lower portion of the drawer chamber 48 parallel to the bottom wall 34. The heater loop 100 is configured to follow generally the periphery of the drawer 22. Thus, each leg of the heater loop 100 extends parallel to and generally beneath the walls 70-76 of the drawer 22. This results in a more even heat distribution within the heating chamber 28 by heating the peripheral wall 96 which then radiates heat into the heating chamber 28, thereby contributing to the reduction of temperature gradients within the drawer 22. This configuration also reduces the heating of the bottom wall 78, particularly in the center, which minimizes the occurrence of a hot spot in the center of the heating chamber 28. The heater loop 100 terminates in a pair of heater terminals 102, 104 which are electrically connected to the control module 26 in a generally well-known manner. The heater terminals 102, 104 extend through the side wall 38 into the control module 26.

A portion of the heater terminals 102, 104 comprises a non-resistive portion 106, 108, thereby minimizing the heating of the non-resistive portions 106, 108 at their penetration through the side wall 38. A temperature sensor 110 extends from the control module 26 through the side wall 38 into the drawer chamber 48 intermediate the heater terminals 102, 104. The positioning of the temperature sensor 110 between the non-resistive portion 106, 108 minimizes direct radiation from the heating element 24 to the temperature sensor 110, which could cause an artificially high temperature reading, thus providing a more accurate reading of the temperature in the heating chamber. The length of the non-resistive portion can vary depending on the type of heating element and the type of temperature sensor. However, the non-resistive portion need only extend as far as necessary to permit the temperature sensor to be unaffected.

It was found that the location of the temperature sensor toward the bottom of the drawer chamber gave more accurate temperature readings than at the top of the chamber as in prior art warming drawers. However, this placed the temperature sensor closer to the heating element, which increased heating element's impact on the temperature sensor. By making the portions of the heating element adjacent the temperature sensor non-resistive, it was possible to locate the heating element in the best position for accuracy while minimizing the influence of the cycling of the heating element on temperature sensor. The temperature sensor 110 configuration described above provides much greater accuracy than prior warming drawers.

Figure 7:
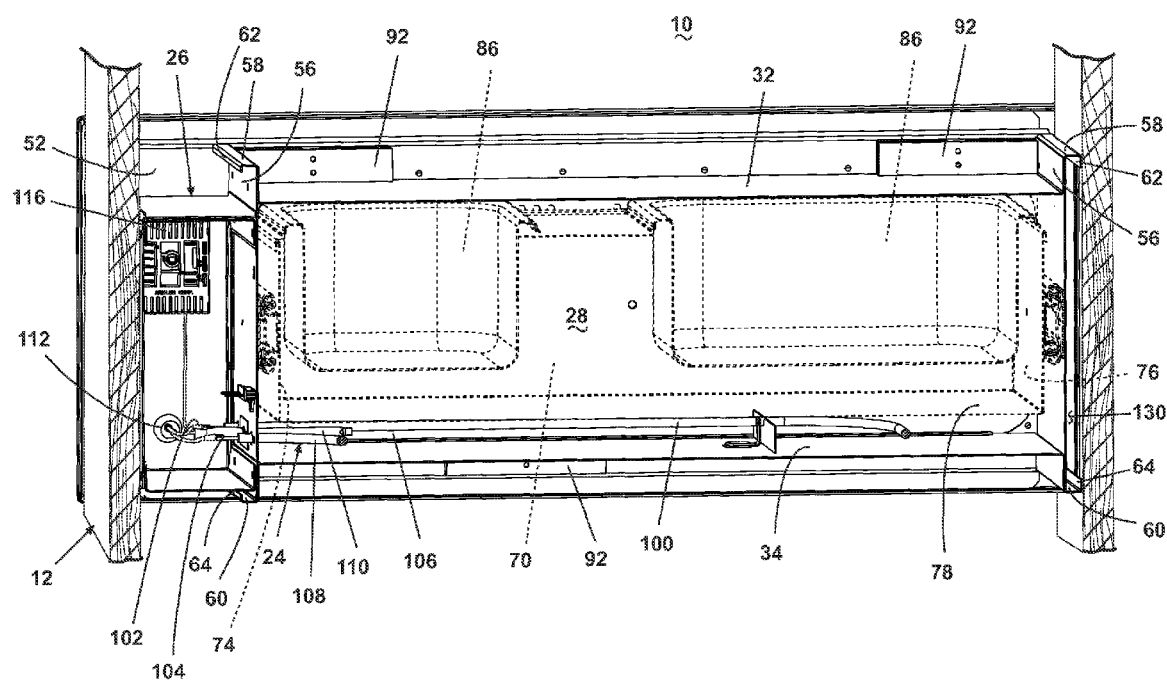
FIG. 7 is a sectional view taken along view line 7-7 of FIG. 4 illustrating the spacing of the warming drawer from the cabinet.
Figure 8:
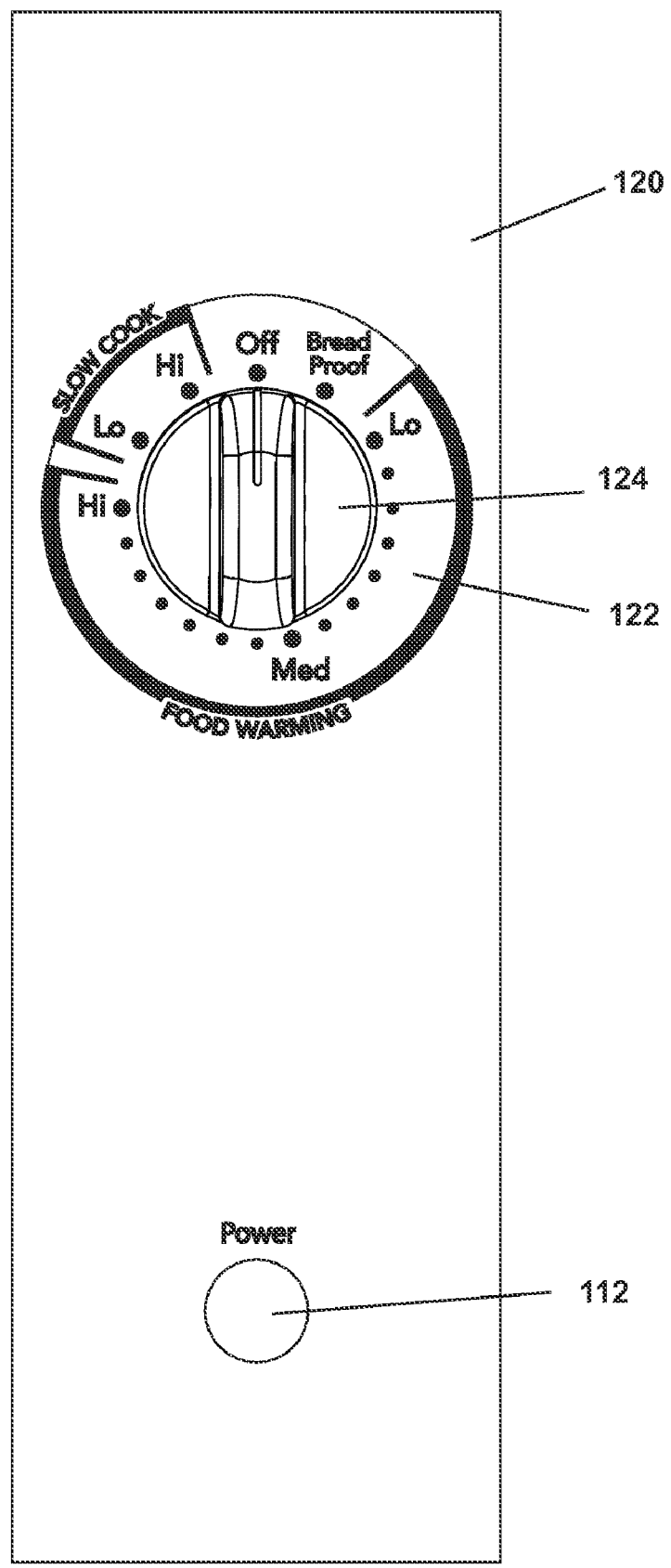
FIG. 8 is an enlarged elevational view of a control switch and power switch assembly illustrated in FIG. 2.

Referring now to FIG. 7, and again to FIG. 3, the control module 26 comprises a power switch 112 and a temperature control switch 114 operatively connected to a circuit board 116. The temperature control switch 114 is a rotary-type switch enabling the selection of temperatures between 100° F. and 250° F. The circuit board 116 is configured for operable control of the heating element 24 and the temperature sensor 110. As illustrated in FIG. 8, the control module 26 has a face plate 120 with an embossed or printed temperature scale 122. The face plate 120 can be attached to the control module flange 52, or the temperature scale 122 can be printed or embossed directly onto the control module flange 52. The temperature control switch 114 comprises a control knob 124 operably disposed with respect to the temperature scale 122 for selecting an operating mode and temperature for the heating chamber 28. These modes and approximate temperatures include:

Bread proofing/raising—100° F.
Food warming, low—140° F.
Food warming, medium—175° F.
Food warming, high—210° F.
Slow cooking, low—220° F. for 8 hours
Slow cooking, high—250° F. for 4 hours.

The temperature control switch 114 can comprise multiple stops over the food warming range to provide a plurality of selectable temperatures between 140° F. and 210° F. in order to enable a more precise warming temperature for foods of different types or quantities.

The warming drawer as disclosed herein is able to maintain a very even temperature distribution without the aid of a convection fan. Most prior art warming 30 drawers having even temperature distribution rely on a convection fan to circulate the air within the cooking chamber to achieve the even temperature distribution. The ability to eliminate the convection fan while still maintaining even heat distribution for cooking performance provides the warming drawer with a substantial cost advantage.

The following Table 1 illustrates the control of temperature achieved with the warming drawer 10 during a controlled laboratory test. The nominal temperature is a selected temperature to which the interior of the drawer was heated. Nine temperature sensors were installed in the drawer at the center (i.e. mid-height) left rear, center center rear, center right rear, center left center, center center center, center right center, center left front, center center front, and center right front of the drawer. The target temperature variation among the sensors is ±10° F. As the tabular data illustrates, the maximum variation in temperature was not greater than ±10° F. between any 2 sensors.

TABLE 1

TEMPERATURE DISTRIBUTION IN WARMING DRAWER

| Nominal Temperature, ° F. | Range of Temperatures Within Drawer, ° F. | Maximum Variation in Temperature, Δ ° F. | Variation from Mean Temperature, ° F. |
| --- | --- | --- | --- |
| 100 | 90-103.7 | 13.7 | 6.9 |
| 142 | 133-149 | 16 | 8 |
| 145 | 136-153 | 17 | 8.5 |
| 148 | 139-154 | 15 | 7.5 |
| 151 | 141-156 | 15 | 7.5 |
| 154 | 146-160 | 14 | 7 |
| 160 | 152-167 | 15 | 7.5 |
| 163 | 157-174 | 14 | 7 |
| 169 | 163-180 | 17 | 8.5 |
| 172 | 163-179 | 16 | 8 |
| 175 | 172-189 | 17 | 8.5 |
| 185 | 175-195 | 20 | 10 |
| 189 | 181-199 | 18 | 9 |
| 191 | 185-203 | 18 | 9 |
| 197 | 187-206 | 19 | 9.5 |
| 206 | 199-217 | 18 | 9 |
| 215 | 207-225 | 18 | 9 |
| 250 | 235-260 | 15 | 7.5 |

The following Table 2 illustrates the effectiveness of the drawer configuration in maintaining the temperature of the adjoining cabinetry below Underwriters Laboratories criteria during a controlled laboratory test. The Drawer Center temperature represents a selected temperature to which the interior of the drawer was heated.

The Side Rail data in the next three columns represents the temperature of the side walls 38, 40 corresponding to the indicated Drawer Center temperature. The Cabinet data in the final three columns represent temperature data corresponding to the indicated Drawer Center temperature for the walls of a wood cabinet enclosing the drawer 10 in a conventional installation such as might be found in a household kitchen. The UL criteria relates to the temperature rise above ambient temperature, and limits the rise to no more

TABLE 2

TEMPERATURE RISE IN ADJOINING CABINET WALLS, ° F.

| Drawer Center | Ambient Temp. | Drawer Left Side Rail-Bottom | Drawer Left Side Rail-Top | Drawer Right Side Rail | Cabinet Left Side | Cabinet Rear | Cabinet Right Side |
|---|---|---|---|---|---|---|---|
| 109.5 | 78.3 | 97.2 | 77.6 | 86.4 | 78.2 | 79.9 | 80.1 |
| 202.9 | 77.3 | 153.5 | 115.2 | 129.2 | 92.9 | 84.9 | 80.3 |
| 266.3 | 80.1 | 195.9 | 151 | 164.1 | 105.1 | 91 | 88.5 |
| 271.2 | 80.6 | 199.4 | 179.2 | 174.9 | 117.9 | 97.8 | 93.1 |
| 259.6 | 82 | 187.7 | 177.3 | 169.3 | 121.5 | 101.8 | 97.4 |
| 267.2 | 81.9 | 195.7 | 181.2 | 173.5 | 126 | 106.6 | 103 |
| 257.4 | 84.6 | 189.1 | 188.2 | 175.8 | 129.5 | 107.1 | 103.5 |
| 263.8 | 86.8 | 192.2 | 189.4 | 181.9 | 131.6 | 107.4 | 105.1 |
| 256.8 | 87.7 | 186.2 | 191.4 | 178.7 | 133.8 | 108.8 | 104.9 |
| 267.4 | 88.1 | 196.7 | 190.5 | 181.4 | 133 | 111.3 | 108.3 |
| 261.2 | 87.4 | 188.2 | 192.2 | 173.5 | 135.4 | 114.5 | 107.5 |
| 262.2 | 90 | 193.2 | 194.1 | 179.7 | 135.9 | 114 | 109.1 |
| 260.9 | 87.4 | 197.5 | 188.4 | 182.5 | 133.9 | 113.2 | 112.6 |
| 255.7 | 91.8 | 190.7 | 192.4 | 177.1 | 136.3 | 116.1 | 111.8 |
| 265.9 | 93.7 | 197.3 | 194.3 | 184.5 | 138.3 | 115.4 | 112.3 |
| 258.7 | 95.3 | 192.9 | 192.6 | 181.4 | 138.1 | 116.1 | 113.3 | than 117° F., or 65° C.

As the data indicates, the temperature rise in the cabinet walls is well below the UL-standard of no more than a 117° F. rise above ambient temperature. For example, during the test, at a Drawer Center temperature of 265.9° F., the Ambient Temperature was 93.7° F. and the Left Side Cabinet temperature was 138.3° F. Thus, the rise in temperature was 138.3° F.−93.7° F.=44.6° F., which is well below the 117° F. UL specification.

The warming drawer described herein provides a range of heating modes, such as bread proofing, low, medium and high food warming, low temperature slow cooking, and high temperature slow cooking. The heating element configuration relative to the peripheral wall of the drawer provides a more even, more easily controlled temperature in the drawer, without hot spots. The positioning of the temperature sensor between non-heat generating heater terminal portions provides greater accuracy in temperature sensing, thereby contributing to enhanced temperature control in the drawer. An active magnetic closer assembly ensures that the drawer is closed and remains closed during warming and cooking operations. The integrated spacers ensure that the side walls of the warming drawer are sufficiently spaced from adjoining cabinetry, and minimize the heat that is conducted from the warming drawer to the cabinetry.

The integrated spacers have been described and illustrated for the side walls of the drawer. However, in an alternate embodiment, an integrated spacer can also be used to space the back wall of the drawer from an adjoining cabinet wall, or to space any other drawer surface that may otherwise conduct heat to an adjoining cabinetry surface.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A warming drawer for mounting within a cabinet having a recess in which the warming drawer is received, the warming drawer comprising:

a housing defining a chamber with an open face and having opposing side walls that define at least a portion of the chamber and a portion of an outer periphery of the housing;

a drawer moveably mounted to the housing for movement into and out of the chamber through the open face, and at least one spacer that projects laterally from the housing and defining a flange that abuts with the cabinet when the warming drawer is mounted within the recess of the cabinet to space the outer periphery formed by the side walls from the cabinet and form dead air spaces between the outer periphery of the housing and the cabinet.

2. The warming drawer according to claim 1, wherein the spacers form the only path along the side walls for heat emanating from the warming drawer to transfer by conduction from the side walls to the cabinet.

3. The warming drawer according to claim 2, wherein the heat emanating from the side walls at locations other than the spacers is transferred to the cabinet by convection.

4. The warming drawer according to claim 1, and further comprising a heating element located in the housing such that the heating element is beneath the drawer when the drawer is in the closed position.

5. The warming drawer according to claim 4, wherein the drawer comprises a bottom wall and a peripheral wall extending upwardly from the bottom wall to define a heating chamber.

6. The warming drawer according to claim 5, wherein the heating element is configured such that a portion of the heating element is nominally located beneath the peripheral wall.

7. The warming drawer according to claim 6, wherein the heating element comprises two terminals that are spaced relative to each other and which pass through the housing, and further comprising a temperature sensor located between the two terminals.

8. The warming drawer according to claim 7, wherein the heating element is a resistive heating element and a portion of the resistive heating element adjacent each of the terminals is substantially non-resistive and the temperature sensor is located between the non-resistive portions.

9. The warming drawer according to claim 7, wherein the two terminals define a plane and the temperature sensor lies in the plane.

10. The warming drawer according to claim 5, and further comprising a controller operably coupled to the heating element to selectively actuate the heating element and configured to selectively actuate the heating element to maintain the temperature in the heating chamber at one of a proofing temperature, a warming temperature, and a slow cooking temperature.

11. The warming drawer according to claim 10, and further comprising an active closer urging the drawer into the closed position.

12. The warming drawer according to claim 11, wherein the active closer comprises a force generator that generates a closing force tending to hold the drawer in a closed position.

13. The warming drawer according to claim 12, wherein the force generator generates a magnetic force as the closing force.

14. A warming drawer for mounting within a cabinet having a recess in which the warming drawer is received, the warming drawer comprising:
a housing defining a chamber with an open face and having opposing side walls that define at least a portion of the chamber and an outer periphery of the housing;
a drawer moveably mounted to the housing for movement into and out of the chamber through the open face; and
at least one spacer that projects laterally from an exterior surface of each of the, side walls of the housing and defining a flange that abuts with the cabinet when the warming drawer is mounted within the recess of the cabinet to space the side walls from the cabinet and form dead air spaces between the exterior surfaces of the side walls of the housing and the cabinet
wherein the edge of the spacers forms the only path for heat emanating from the warming drawer to transfer by conduction from the housing to the cabinet.

15. A warming drawer for mounting within a cabinet having a recess in which the warming drawer is received, the warming drawer comprising:
a housing defining a chamber with an open face and having opposing side walls that define at least a portion of the chamber and an outer periphery of the housing;
a drawer moveably mounted to the housing for movement into and out of the chamber through the open face;
at least one spacer extending from an exterior surface of each of the side walls of the housing to space the side walls from the cabinet when the warming drawer is mounted within the recess of the cabinet to form dead air spaces between the exterior surfaces of the side walls of the housing and the cabinet;
a heating element comprising two terminals that are spaced relative to each other and which pass through the housing and located in the housing such that the heating element is beneath the drawer when the drawer is in the closed position; and
a temperature sensor located between the two terminals
wherein the heating element is a resistive heating element and a portion of the resistive heating element adjacent each of the two terminals is substantially non-resistive and the temperature sensor is located between the non-resistive portions.

16. A warming drawer for mounting within a cabinet having a recess in which the warming drawer is received, the warming drawer comprising:
a housing defining a chamber with an open face providing access to the chamber;
a drawer moveably mounted to the housing for movement into and out of the chamber through the open face between a closed and open position;
a heating element comprising two terminals that are spaced relative to each other and which pass through the housing and are located in the housing such that the heating element is beneath the drawer when the drawer is in the closed position; and
a temperature sensor located between the two terminals
wherein the heating element is a resistive heating element and a portion of the resistive heating element adjacent each of the terminals is substantially non-resistive and the temperature sensor is located between the non-resistive portions.

17. The warming drawer according to claim 16, further comprising a seal provided on one of the housing and drawer and extending the periphery of the open face of the chamber forming a seal between the housing and drawer when the drawer is in the closed position and an active closer comprising a force generator that generates a magnetic closing force tending to hold the drawer in the closed position for urging the drawer into the closed position.

18. The warming drawer according to claim 17, wherein the active closure positively maintains the drawer in the closed position.

19. The warming drawer according to claim 17, wherein the active closer presses the seal against the other of the housing and drawer.

20. The warming drawer according to claim 17, wherein the seal is compressible and the active closer compresses the seal between the housing and drawer.

21. The warming drawer according to claim 17, wherein the force generator comprises a first magnet located on at least one of the housing and drawer.

22. The warming drawer according to claim 21, wherein the magnet is located in the seal.

23. The warming drawer according to claim 21, wherein the force generator further comprises a second magnet located on the other of the housing and drawer such that the first and second magnets are magnetically attracted to each other to generate the closing force.

24. The warming drawer according to claim 23, wherein the force generator further comprises the other of the housing and drawer being made of metal such that the magnet is magnetically attracted to the other of the housing and drawer to generate the closing force.

25. The warming drawer according to claim 17, wherein the housing comprises a peripheral lip defining the open face, the drawer comprises a peripheral flange located adjacent the peripheral lip when the drawer is in the closed position, and the seal is provided on one of the lip and flange.

26. The warming drawer according to claim 16, and further comprising a heating element located in the housing such that the heating element is beneath the drawer when the drawer is in the closed position.

27. The warming drawer according to claim 26, wherein the heating element is a resistive heating element.

28. The warming drawer according to claim 27, wherein the drawer comprises a bottom wall and a peripheral wall extending upwardly from the bottom wall to define a heating chamber.

29. The warming drawer according to claim 28, wherein the resistive heating element is shaped such that a portion of the resistive heating element generally follows the shape of the peripheral wall.

30. The warming drawer according to claim 29, wherein the resistive heating element is shaped such that no portion of the resistive heating element is located beneath a central portion of the bottom wall when the drawer is in the closed position.

31. The warming drawer according to claim 27, wherein the resistive heating element comprises two terminals that are spaced relative to each other and which pass through the housing.

32. The warming drawer according to claim 31, and further comprising a temperature sensor located between the two terminals.

33. The warming drawer according to claim 32, wherein a portion of the resistive heating element adjacent each of the terminals is substantially non-resistive and the temperature sensor is located between the non-resistive portions.

34. The warming drawer according to claim 33, wherein the resistive heating element defines a plane and the temperature sensor lies in the plane.

* * * * *